United States Patent [19]
Ulrich et al.

[11] Patent Number: 5,071,951
[45] Date of Patent: Dec. 10, 1991

[54] EPOXY HARDENING AGENTS

[75] Inventors: Grundke Ulrich, Duisburg; Alfred Mathes, Rheinberg; Achim Hansen, Dusselforf; Rolf Herzog, Bottrop, all of Fed. Rep. of Germany

[73] Assignee: Rutgerswerke AG, Fed. Rep. of Germany

[21] Appl. No.: 536,023

[22] Filed: Jun. 11, 1990

[30] Foreign Application Priority Data

Jun. 15, 1989 [DE] Fed. Rep. of Germany ....... 3919547

[51] Int. Cl.$^5$ ............................................. C08G 59/50
[52] U.S. Cl. ...................... 528/111; 528/73; 528/369; 560/158
[58] Field of Search ......................... 528/73, 111, 369; 560/158

[56] References Cited

U.S. PATENT DOCUMENTS

| 4,115,360 | 9/1978 | Schulze et al. | 528/111 X |
| 4,115,361 | 9/1978 | Schulze et al. | 528/111 |
| 4,115,446 | 9/1978 | Schulze | 528/111 X |
| 4,122,069 | 10/1978 | Meyer | 528/111 X |
| 4,139,524 | 2/1979 | Waddill | 528/111 X |
| 4,146,701 | 3/1979 | Waddill et al. | 528/111 X |
| 4,178,426 | 12/1979 | Waddill | 528/111 |
| 4,187,367 | 2/1980 | Waddill | 528/111 X |
| 4,562,241 | 12/1985 | Renner | 528/369 X |

*Primary Examiner*—Earl Nielsen
*Attorney, Agent, or Firm*—Bierman and Muserlian

[57] ABSTRACT

A hardening agent for epoxy compounds prepared by reacting A) at least one member of the group consisting of polyalkyleneetherdiols and polyalkyleneetherpolyols with B) at least one polyisocyanate with a molar ratio of hydroxy groups to isocyanate group of 1:1.8 to 3, reacting the resulting product with C) an amine having at least one free primary or secondary amino group and at least one protected primary amino group with a molar ratio of isocyanate to amino groups of 1:1 to 2 and subjecting the latter product to hydrolysis useful for preparation of flexible hardened products with excellent mechanical properties.

12 Claims, No Drawings

EPOXY HARDENING AGENTS

STATE OF THE ART

Hardening agents are known to one skilled as flexible hardeners and the use of polyether-urethane-urea amines in epoxy resin hardeners is known. These hardeners make possible the production of high-grade epoxy resin molding compositions which are used as backing or coating materials, for the manufacture of shaped bodies and laminates, or as sealing materials. DE-OS 2,338,256 describes flexible hardeners based on polyether urethane urea amines which have the disadvantage that they have very high viscosities and therefore are usable only in solution, and this greatly limits their use in many areas or even makes it impossible.

DE-OS 3,151,592 describes flexible hardeners based on polyether urethane carbamic acid aryl esters which are produced by reaction of polyether urethane carbamic acid aryl esters with amines. The use of polyether urethane carbamic acid aryl esters as an intermediate stage leads, because of the more selective reaction, to products of lower viscosity. The phenolic compounds released in the reaction, frequently phenol or nonyl phenyl remain in the hardener component, however, and do not react with the epoxy resin during hardening. The presence of the phenolic components not chemically bound into the polymer network leads to a number of considerable disadvantages.

The phenolic components bring about a worsening of the mechanical properties in the fully hardened molding substances which is attributable to their action as external plasticizers and a reduction of the network density. This limits the area of use considerably and precludes applications such as in the fiber composite sector. Moreover, in fiber composite materials, there occurs in the area of the boundary face of fiber and matrix additionally a reduced adhesion due to a concentration of the phenolic components contained in the hardener. Besides, the long-term stability of the mechanical values and the chemical stability are insufficient, as the phenolic components diffuse out, are dissolved out, or support the absorption of water, solvents and chemicals. Also, phenols lead to an acceleration of the hardening reaction of amines with epoxy resins which is often undesired.

OBJECTS OF THE INVENTION

It is an object of the invention to provide novel hardening agents for epoxy resins and a novel method for their preparation.

It is another object of the invention to provide novel hardenable resin compositions and to products produced therefrom having excellent mechanical properties.

These and other objects and advantages of the invention will become obvious from the following detailed description.

THE INVENTION

The novel hardening agents of the invention for epoxy resins are prepared by reacting A) at least one member of the group consisting of polyalkyleneetherdiols and polyalkyleneetherpolyols with B) at least one polyisocyanate with a molar ratio of hydroxy groups to isocyanate group of 1:1.8 to 3, reacting the resulting product with C) an amine having at least one free primary or secondary amino group and at least one protected primary amino group with a molar ratio of isocyanate to amino groups of 1:1 to 2 and subjecting the latter product to hydrolysis.

The flexible hardeners of the invention result in products hardened with epoxy compounds having the same good property profile as epoxy resins hardened with flexible hardeners of DE-OS 3,151,592, but which contain reactive components exclusively, i.e., components which during the hardening reaction are chemically incorporated in the molding material in a covalent manner via an amine-epoxide reaction and thus are free from external plasticizers.

Together with one or more epoxy compounds, the hardening agents are useful for the production of flexible shaped parts or flat structures, particularly laminates, as well as for the production of sealants and adhesives or for coatings. Moreover, the hardening agents are suitable as reactive emulsifiers for the production of water-emulsifiable epoxy binders.

It has been found that the hardeners with epoxy compounds result in flexible hardened products of good resistance to chemicals and aging, good electrical and physical properties, particularly increased resistance to tear propagation when isocyanate-terminal reaction products of polyalkylenediols or polyalkylenepolyols with di- and/or poly-isocyanates, are reacted with an amine which contains at least one free, primary or secondary amino group and at least one primary amino group blocked with a protective group, and the resulting compounds are hydrolyzed.

The amino-terminal hardeners thus produced are lightcolored products of low to high viscosity (10–60 Pa.s at 52° C.) which are mixed, if desired, with additional reactive hardener components, with epoxy compounds, particularly epoxy resins having at least two epoxide groups per molecule unit in an equimolar ratio of amino and epoxide groups. The hardening is done either at room temperature over 24 to 72 hours after the mixing (processability time: 3 to 5 hours), or at elevated temperature.

Moreover, the hardening agents of the invention can be used in a manner known per se in combination with additional customary amine hardeners such as aliphatic and/or cycloaliphatic polyamines, polyamides, amine-terminal polyalkylethers, primary longer-chain monamines, or amine-terminal butadieneacrylic nitrile copolymers.

The production of the hardeners of the invention takes place in three reaction steps from known precursor products:

(1) Reaction of polyalkylenediols and/or polyalkylenepolyols with di- and/or polyisocyantes.

(2) Reaction of the reaction product from (1) with an amine containing at least one free primary or secondary amino group and at least one primary amino group protected with a protective group, the free primary or secondary amino groups reacting with the isocyanate groups of the reaction product from (1).

(3) Hydrolysis of the reaction product from (2) with splitting off of the protective group and hence release of the primary amino (3).

By this controlled reaction of components in a defined manner, precisely predetermined hardening agents are synthesized, the composition and structure of which does not vary in different product batches.

For the first reaction step, commercial polyalkyleneetherdiols and/or polyalkyleneetherpolyols and isocyanate compounds are used which have medium molecular weights between 100 and 5,000, preferably between 400 and 2,000. Especially preferred are polyethylene oxides or polypropylene oxides. Examples of di- or poly-isocyanates are 2,4- and 2,6-toluylene diisocyante or mixtures thereof, 4,4-diphenylmethane diisocyanate, m-xylylene diisocyanate, 2,2,4-(2,4,4)-trimethylhexamethylene diisocyanate, 1,6-hexamethylene diisocyanate, 1-isocyanato-3-isocyanatomethyl-3,5,5-trimethyl-cyclohexane (also called isophorone diisocyante) and the addition product of 1 mole of trimethylolpropane and 3 moles of isophorone diisocyanate. Especially suited are aliphatic and cycloaliphatic diisocyanates such as hexamethylene diisocyanate and isophorone diisocyanate.

For the production of the reaction products, the polyalkyleneether di- or polyols and the isocyanates are mixed to adjust a ratio of the OH groups to the isocyanate groups of 1:1.8 to 3, but preferably 1:2.1 to 2.5. The reaction mixture is heated, optionally with a solvent and/or with small amounts of a catalyst suchas 0.1% dibutyl tin dilaurate for several hours at 50° to 100° C. until the analytically determined isocyanate content is largely in agreement with the calculated value.

The isocyanate compounds thus produced are subjected without further processing to the second reaction step and any catalyst present in the reaction mixture catalyzes also the second reaction. For this reaction, amines can be used which contain at least one primary and one secondary amino group, at least one primary amino group being blocked with a protective group. Examples of usable amines are ethylene diamine, diethylene triamine, 1,2-diaminopropane, 1,3-diaminopropane, 1,3-diaminobutane, 1,4-diaminobutane, 3-(n-isopropylamino)-propylamine, hexapropylene heptamine, 1-cyclohexylamino-3-aminopropane, 1,4-diaminocyclohexane, 1,3-diaminocyclohexane, 2,4-diaminocyclohexane, 1,3-di(aminocyclohexyl)-propane, N,N'-diethyl-1,3-diaminopropane, N,N'-diethyl-1,4-diaminocyclohexane, N-aminoethyl piperazine, N-aminopropyl piperazine, N-aminobutyl piperazine, 1,3-dipiperazinyl propane, 1,3-dipiperidyl propane, 3-(2-aminoethyl)-aminopropylamine, N,N'-bis-(3-aminopropyl)-ethylene diamine, the commercial primary aliphatic polyoxypropylene di- or tri-amines, phenylene diamine, 4,4'-diamino-diphenyl methane as well as ether diamines such as 1,7-diamino-4-oxa-heptane, 1,7-diamino-3,5-dioxa-heptane, 1,10-diamine-4,7-dioxa-decane, 1,10-diamino-4,7-dioxa-5-methyl decane, 1,11-diamino-6-oxa-undecane, 1,11-diamino-4,8-dioxa-undecane, 1,11-diamino-4,8-dioxa-5-methyl-undecane, 1,11-diamino-4,8-dioxa 5,6-dimethyl-7-propionyl-undecane, 1,12-diamino-4,9-dioxadodecane, 1,13-diamino-4,10-dioxa-tridecane, 1,13-diamino-4,7,10-trioxa-5,8-dimethyl-tridecane, 1,14-diamino-4,11-dioxatetradecane, 1,14-diamino-4,7,10-trioxa-tetradecane, 1,16-diamino-4,7,10,13-tetraoxa-hexadecane, 1,20-diamino-4,17-dioxaeicosane, and in the particular hexamethylene diamine, 3,3,5(3,5,5)-trimethyl-hexamethylene diamine and 3,3'-dimethyl-4,4'-diaminodicyclohexyl methane and particularly isophorone diamine, N-aminoethyl-piperazine, 1,2-diaminopropane, methyl-petamethylene diamine, xylylene diamine or mixtures of these amines but also polyaminoamides or polyalkylenepolyamines.

Corresponding protective groups are obtained by reaction of the primary amino group with aldehydes or ketones, particularly with methyl ethyl ketone, methyl propyl ketone, methyl butyl ketone, diethyl ketone or dipropyl ketone.

The reaction of the isocyanate compound with the free amino group of the partially blocked amine is the most delicate step. While the corresponding hydroxy compounds react very selectively with isocyanates, with amines there is the danger that the isocyanate groups will react with one another in the alkaline medium whereby undesired secondary reactions will take place. It has been found that these secondary reactions can be avoided to a large extent if the reaction takes place in the presence of 20 to 80% solvents such as aromatics, alcohols, esters, ketones or ethers. Besides, it is advisable to add to the reaction medium small amounts, 0.001 to 2%, of a catalyst customarily used for this reaction such as diazabicyclooctane, dibutyl tin dilaurate, or tin(II)-octoate.

Thus, 1 mole of the reaction product from the first step is slowly added to 2 to 4 moles, preferably 2.6 to 3.2 moles, of blocked amine and reacted for 3 to 5 hours at 60° to 80° C. and then free isocyanate groups are no longer present. Per equivalent of charged amine blocked with protective group, 1 to 2 moles of water are then added to the reaction mixture and the mixture is maintained for about one hour at 60° to 80° C. Thereafter, the volatile components such as solvent, excess water, and the split-off protective group are distilled off to obtain the product ready for use as hardening agent for epoxy compounds.

In the following examples there are described several preferred embodiments to illustrate the invention. However, it should be understood that the invention is not intended to be limited to the specific embodiments. The term wt % means parts by weight and RT means room temperature.

EXAMPLE 1

A mixture of 129 g of N-aminoethyl-piperazine, 200 g of methyl isobutyl ketone, 200 g of cyclohexane and 0.3 g of p-toluene-sulfonic acid was refluxed for 3 to 4 hours at the water separator and then excess solvent was removed under vacuum to obtain an amine-ketimine.

EXAMPLE 2

444 g of isophorone diisocyanate were dissolved in dry toluene and heated to 50° to 60° C. After addition of 1 g of dibutyl tin dilaurate, 2,000 g of polypropyleneoxide diol of a mean molecular mass f 2,000 were added dropwise over 3 hours and then the mixture was heated 2 hours post-reaction at 80° to 85° C. to obtain an isocyanate prepolymer.

EXAMPLE 3

444 g of isophorone diisocyanate were dissolved in dry toluene and heated to 50° to 60° C. and after addition of 1 g of dibutyl tin dilaurate, 700 g of polypropyleneoxide diol of a mean molecular mass of 700 were added dropwise over 3 hours. Then, the mixture was heated 2 hours for post-reaction at 80° to 85° C. to obtain isocyanate prepolymer.

EXAMPLE 4

348 g of 2,4-toluenediisocyanate were dissolved in dry toluene and heated to 50° to 60° C. and after addition of 1 g of dibutyl tin dilaurate, 2,000 g of polypropyleneoxide diol of a mean molecular mass of 2,000 g were added dropwise over 3 hours. Then, the mixture was heated 2 hours for post-reaction at 80° to 85° C. to obtain an isocyanate prepolymer.

EXAMPLE 5

2,444 g of the isocyanate prepolymer of Example 2 were added dropwise over 3 hours at 80° C. to 764 g of the amineketimine of Example 1 and after another 3 hours of post-reaction at 80° C., 100 g of water were added. The reaction mixture was stirred for 1 hour at 80° C. and then the solvent, ketone and water were removed at the rotary evaporator to form a flexible hardener component having a viscosity of 19,500 mPa.s at 52° C. and an amine equivalent of 565.

EXAMPLE 6

1,144 g of the isocyanate prepolymer of Example 3 were added dropwise at 80° C. over 3 hours to 764 g of the amineketimine produced in Example 1 and after another 3 hours of post reaction at 80° C., 100 g of water were added. The reaction mixture was stirred for 1 hour at 80° C. and then the solvent, ketone and water were removed at the rotary evaporator. After addition of 144 g of trimethyl hexanemethylenediamine, a flexible hardener component of a viscosity of 21,000 mPa.s at 52° C. and an amine equivalent of 183 was obtained.

EXAMPLE 7

2,348 g of the isocyanate prepolymer of Example 4 were added dropwise at 80° C. over 3 hours to 764 g of the amineketimine of Example 1 and after another 3 hours of post-reaction at 80° C., 100 g of water were added. The reaction mixture was stirred for 1 hour at 80° C. and then the solvent, ketone and water were removed at the rotary evaporator to obtain a flexible hardener component having a viscosity of 73,700 mPa.s at 52° C. and an amine equivalent of 553.

EXAMPLES 8 to 10

Comparison Examples

EXAMPLE 8

2,444 g of the isocyanate prepolymer of Example 2 were masked with 440 g of nonyl phenol and then reacted with 310 g of N-aminoethyl piperazine. The hardener had an amine equivalent of 650 and a content of free nonyl phenol of about 13%.

EXAMPLE 9

1,144 g of the isocyanate prepolymer of Example 3 were masked with 440 g of nonyl phenol and then reacted with 310 g of N-aminoethyl piperazine and 288 g of trimethylhexam ethylene diamine. The hardener had an amine equivalent of 233 and a content of free nonyl phenol of about 20%.

EXAMPLE 10

1,144 g of the isocyanate prepolymer of Example 3 were masked with 188 g of phenol and then reacted with 310 g of N-aminoethyl piperazine and 288 g trimethyl hexane ethylenediamine. The hardener had an amine equivalent of 204 and a content of free phenol of about 10%.

EXAMPLE 11

100 wt % each time of an epoxy resin on the basis of Bisphenol-A and epichlorohydrin with an epoxide equivalent of 186 and a viscosity of 9,800 mPa.s at 25° C. were mixed with various hardeners and the adhesive strength of single-row overlapped bonds with double-plated aluminum strips was determined according to DIN 53,283. The results are shown in Table I.

TABLE I

| Hardener from Example | wt % | Adhesive strength after 7 days at 2 hours at 100° C. room temperature |
|---|---|---|
| 5 | 304 | 12.1 N/mm² |
| 6 | 98 | 26.3 N/mm² |
| 8 | 349 | 8.4 N/mm² |
| 9 | 125 | 17.6 N/mm² |
| 10 | 110 | 19.7 N/mm² |

EXAMPLE 12

The epoxy resin of Example 11 was hardened with various hardeners for 8 hours at 40° C., 4 hours at 80° C. and then 2 hours at 130° C. Thereafter, the second order transition temperature Tg was determined:
  a. 75.15 wt % of resin, 14.85 wt % isophorone diamine and 10.0 wt % of hardener per Example 6, Tg: 118° C.
  b. 75.05 wt % of resin, 14.95 wt % of isophorone diamine and 10.0 wt % of hardener per Example 7, Tg: 121° C.
  c. 73.15 wt % of resin, 14.45 wt % isophorone diamine and 12.4 wt % of hardener of Example 9, Tg: 110° C.

EXAMPLE 13

100×100×4 mm test specimens produced with epoxy resin-hardener mixtures of Example 12 a to c were extracted each time at 40° C. with 800 ml of water (pH 7) and with linseed oil, and any extracted phenols were determined by gas chromatography.

The results are shown in Table II

TABLE II

| Sample from Example | Aqueous extraction 1st to 3rd day | Oil extraction 1st to 3rd day |
|---|---|---|
| 11 a | no phenol | no phenol |
| 11 b | no phenol | no phenol |
| 11 c | nonyl phenol 2.4 mg/m²d | nonyl phenol 3.1 mg/m²d |

EXAMPLE 14

Plates 4 mm thick with 16 layers of glass fabric were produced each time with the following epoxy resin systems 1 and 2 by wet lamination and tempered for 16 hours at 120° C. The epoxy resin used was a mixture of 56 wt % of Bisphenol A epoxy resin, 24 wt % of Bisphenol F epoxy resin and 20 wt % of hexandiol diglycidyl ether. The epoxy resin systems or the plates produced therewith were tested for the following properties:

Second order transition temperature Tg
Bending strength (DIN 53,452) at Tg −15° C.
Bending strength (DIN 53,452) at Tg −15° C. after moist storage 4 hours at 80° C.
Interlaminar shear strength (DIN 29,971) at 25° C.
Gas evolution rate for determining fitness for space travel per ESA Standard PSS 01 702.

EPOXY RESIN SYSTEMS

System 1: 67.3 wt % of epoxy resin, 17.7 wt % of 3,3'-dimethyl-4,4'-diaminodicyclohexyl methane, and 15.0 wt % of hardener of Example 6.

System 2: (Comparison example) 66.5 wt % of epoxy resin, 18.5 wt % of 3,3'-dimethyl-4,4'-diaminodicyclohexyl methane and 15.0 wt % of hardener of Example 9. The results obtained are shown in Table III.

TABLE III

| | System 1 | System 2 |
|---|---|---|
| Tg | 102° C. | 95° C. |
| Bending strength at temp. = Tg - 15° C. | 319 N/mm$^2$ | 277.8 N/mm$^2$ |
| Bending strength at Temp. = Tg - 15° C. after moist storage | 264.1 N/mm$^2$ | 219.6 N/mm$^2$ |
| Interlaminer shear strength | 45.5 N/mm$^2$ | 38.2 N/mm$^2$ |
| Gas evolution rates | passed | did not pass |

Various modifications of the compositions and method of the invention may be made without departing from the spirit or scope thereof and it is to be understood that the invention is intended to be limited only as defined in the appended claims.

What we claim is:

1. A hardening agent for epoxy compounds prepared by reacting A) at least one member of the group consisting of polyalkyleneetherdiols and polyalkyleneetherpolyols with B) at least one polyisocyanate with a molar ratio of hydroxy groups to isocyanate group of 1:1.8 to 3, reacting the resulting product with C) an amine having at least one free primary or secondary amino group and at least one protected primary amino group with a molar ratio of isocyanate to amino groups of 1:1 to 2 and subjecting the latter product to hydrolysis.

2. A hardener mixture for epoxy compounds comprising a hardening agent of claim 1 and a conventional amine hardener.

3. A hardening agent of claim 1 wherein the ratio of hydroxy groups to isocyanate groups is 1:2.1 to 2.5.

4. A hardening agent of claim 1 wherein the amine is a piperazine ketimine compound.

5. A hardening agent of claim 4 wherein the ketimine is formed from methyl isobutyl ketone and N-propylamino-piperazine.

6. A method for the preparation of the hardening agent of claim 1 comprising reacting A) at least one member of the group consisting of polyalkyleneetherdiols and polyalkyleneether polyols with B) at least one polyisocyanate with a molar ratio of hydroxy groups to isocyanate group of 1:1.8 to 3, reacting the resulting product with C) an amine having at least one free primary or secondary amino group and at least one protected primary amino group with a molar ratio of isocyanate to amino groups of 1:1 to 2 and subjecting the latter product to hydrolysis.

7. The method of claim 6 wherein the reaction of the amine and the isocyanate containing compound is effected in a solvent.

8. A flexible shaped element or flat structure made from at least one epoxy resin hardened with a hardening agent of claim 1.

9. A laminate made from at least one epoxy resin hardened with a hardening agent of claim 1.

10. An epoxy resin adhesive or coating containing a hardening agent of claim 1.

11. An epoxy resin sealant containing a hardening agent of claim 1.

12. A curable epoxy resin containing a hardening agent of claim 1.

* * * * *